United States Patent [19]

Wong

[11] Patent Number: 4,709,826

[45] Date of Patent: Dec. 1, 1987

[54] APPARATUS FOR THE RETENTION OF FLUID FLOWING FROM A CONTAINER

[76] Inventor: Mon N. Wong, 4132 Konya Dr., Torrance, Calif. 90503

[21] Appl. No.: 20,219

[22] Filed: Mar. 9, 1987

Related U.S. Application Data

[63] Continuation of Ser. No. 811,766, Dec. 20, 1985, abandoned.

[51] Int. Cl.⁴ .......................... B65D 1/34; B65D 25/20
[52] U.S. Cl. .................................. 220/1 C; 180/69.1; 206/818
[58] Field of Search ...................... 220/1 C; 206/818; 180/69.1, 106

[56] References Cited

U.S. PATENT DOCUMENTS

| | | | |
|---|---|---|---|
| 572,641 | 12/1896 | Kriner | 220/1 C |
| 2,731,056 | 1/1956 | Anson | 215/100.5 |
| 2,899,019 | 8/1959 | Colgan | 180/69.1 |
| 3,042,841 | 7/1962 | Bryan | 206/818 |
| 3,329,231 | 7/1967 | Takenouchi | 180/69.1 |
| 3,354,989 | 11/1967 | Anderson | 220/1 C |
| 3,480,145 | 11/1969 | Gladden | 206/818 |
| 3,651,884 | 3/1972 | Dorries | 180/69.1 |
| 3,669,204 | 6/1972 | Andrews | 180/69.1 |
| 3,997,073 | 12/1976 | Morris | 220/1 C |
| 4,245,748 | 1/1981 | Kvamsdal | 220/1 C |

*Primary Examiner*—George E. Lowrance
*Attorney, Agent, or Firm*—William J. Benman, Jr.

[57] ABSTRACT

Apparatus for catching fluid leaking from underneath a vehicle is provided. The invention includes means for supporting a receptacle relative to a vehicle which is leaking fluid in a position whereby the fluid flows into the receptacle. In a preferred embodiment, the means for supporting the receptacle is a magnet which is bonded to the receptacle. A specific embodiment includes material for absorbing the fluid after it has flowed into the receptacle. In the illustrated embodiment, the material is a foam. The specification sets forth other aspects of the invention designed to reduce weight, reduce cost, improve strength and improve overall performance.

3 Claims, 2 Drawing Figures

APPARATUS FOR THE RETENTION OF FLUID FLOWING FROM A CONTAINER

This is a continuation of application Ser. No. 06/811,766, filed Dec. 20, 1985, now abandoned.

BACKGROUND OF THE INVENTION

1. Field of the Invention

The present invention relates to vehicles and machinery. More specifically, the present invention relates to devices used to arrest the leaking of oil and other fluids from vehicles and machinery.

While the present invention is described herein with reference to a particular embodiment for use in a particular application, it is understood that the present invention is not limited thereto. Those having ordinary skill in the art and access to the teachings of the present invention will recognoze additional modifications and embodiments within the scope thereof.

2. Description of the Related Art

The problem of oil leaking from cars is well known. A moderate estimate is that millions of quarts of oil are leaked on U.S. roads and parking areas each year.

Numerous products have been developed to solve or abate the problem. Most typical are oil additives. Several formulas are currently being used to stop oil leaks. Some include granules of metal eg. lead. Others include a petroleum based jelly. Some simply use a thick oil to reduce leakage.

Unfortunately, the problem is often not permanently abated with such liquid solutions. Where such solutions have proved effective, the initially positive results have often not been permanent because of the extremes of temperature, pressure and aging which may cause the liquid to lose some of its properties. Where such is the case, the solution must be replaced.

In addition, the use of an additive or a thick oil often forces a compromise in the performance of the oil. That is, the cooling and lubricating properties of the oil may be diminished by the additive. Clearly, the use of a thick oil has an adverse effect on the efficiency of most engines.

Finally, it is often not practical or cost effective to simply fix all such oil leaks. That is, it is often difficult to determine the source of the leak and when located, it is often costly and time consuming to effect the necessary repairs.

The unabated leaking of oil from vehicles causes unattractive oil spots on the driveways of homeowners and along with the solvents used for the clean-up thereof, causes an adverse impact on the environment.

Therefore, there exists a need for an inexpensive yet effective solution to the problem of oil leaking from vehicles and machinery.

SUMMARY OF THE INVENTION

The shortcoming of prior art oil leakage abatement schemes are addressed by the present invention which includes a receptacle for catching leaking fluid. The invention includes means for supporting the receptacle relative to a vehicle which is leaking fluid in a position whereby the fluid flows into the receptacle. In a preferred embodiment, the means for supporting the receptacle is a magnet which is bonded to the receptacle. A specific embodiment includes material for absorbing the fluid after it has flowed into the receptacle. In the illustrated embodiment, the material is a foam. The specification sets forth other aspects of the invention designed to reduce weight, reduce cost, improve strength and improve overall performance.

DESCRIPTION OF THE INVENTION

The present invention provides a lightweight inexpensive mini oil pan for catching oil dripping from beneath a vehicle.

Figure 1:
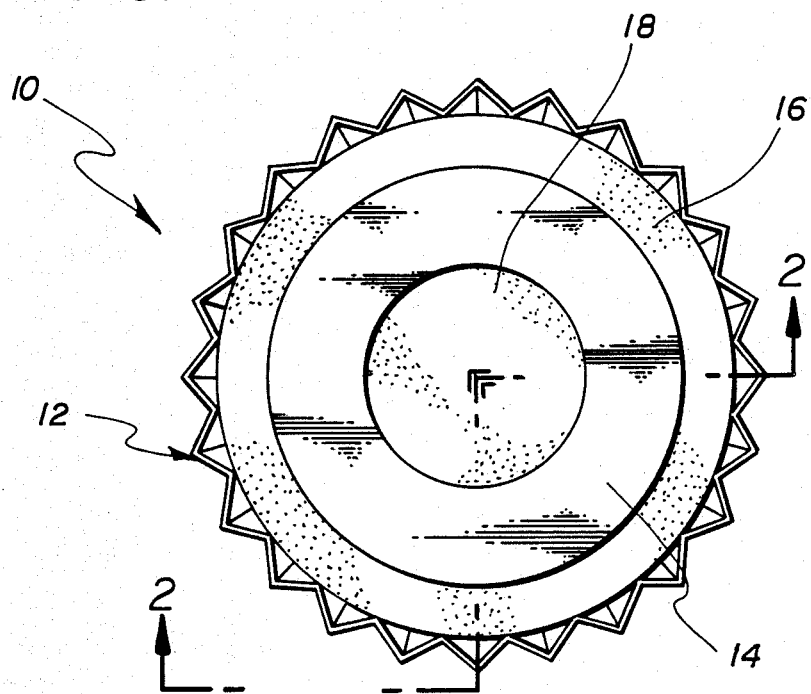
FIG. 1 is a top plan view of the preferred embodiment of the present invention.

As shown in FIG. 1, the apparatus 10 includes a mini-oil pan or receptacle 12 in which a magnet 14 is bonded. The pan 12 is made of a thin sheet of aluminum and shaped like a pie shell. That is, the pan 12 has a planar circular bottom 13 with upwardly extending sides 15 (see FIG. 2). In the preferred embodiment, the sides 15 are corrugated to allow for a thinner and lighter construction of the pan 12. Representative dimensions of the pan are 4 inches in outer diameter, sides being 0.4 inches tall and the sheet metal being 0.010 inches thick.

The magnet 14 is annular to allow more volume for the retention of fluid. The magnet is made of any suitable magnetic material. In the preferred embodiment, the magnet has a pulling force of six pounds a height of $\frac{1}{4}''$ and a diameter of 3". The opening is 1.25" in diameter. The magnet 14 is bonded to the pan 12 by an off-the-shelf epoxy.

A ring of absorptive material 16 surrounds the magnet 14. A cylindrical shaped piece 18 of the same absorptive material is placed in the center of the magnet 14. In the preferred embodiment, the absorptive material is foam though other suitable materials, including paper and cloth, may be used. The foam serves to prevent spillage of the oil when a vehicle carrying the apparatus 10 travels uphill, downhill or through rough terrain.

Figure 2:
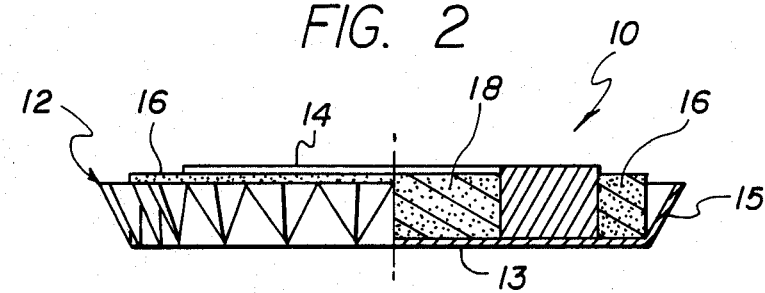
FIG. 2 is a side elevational view in quarter section of the preferred embodiment of the present invention.

FIG. 2 shows the apparatus 10 in a side elevational view. A cross-section is taken along the line 2—2. The view of FIG. 2 shows the corrugation of the sides 15 of the pan 12. It also shows the height of the magnet 14 as being greater than that of the sides 15. States alternatively, the sides 15 are recessed relative to the magnet 14. The purpose is to provide adequate clearance so that the sides 15 do not touch the vehicle and thereby cause oil to drip down the outside of the pan 12. The cross-section also shows the foam pieces 16 and 18 around the periphery of and at the center of the magnet 14.

OPERATION

First, a position appropriate for mounting the apparatus 10 is chosen underneath a vehicle suspected of leaking oil. The position is located by selecting a surface in the vicinity of a point from which oil drips. Debris should be removed from the surface and the surface should be as clean as reasonably possible to allow for a firm attachment by the magnet 14.

Next, the apparatus 14 is placed underneath the vehicle on the surface in the area chosen. If the position is properly chosen, the apparatus 10 of the present invention will catch oil that drips in any area immediately above it. The attachment is most secure when the apparatus 10 is placed against a reasonably flat ferro-alloy surface such as transmission gear box, a differential gear box, or an oil pan.

As the vehicle or machine is used in its customary fashion, oil will accumulate in the pan 12. The apparatus 10 will not appreciably affect the road clearance of the vehicle if the above provided dimensions are used as the apparatus 10 will hang no more than ½" beneath the vehicle.

After the apparatus has been in place for some time, it should be removed for cleaning. If foam is used, it may be cleaned by rinsing for example. If a disposable material is used, new inserts should be placed into the pan 12. The replacement cycle will depend on the rate of leakage and the capacity of the pan used.

While the present invention has been described with reference to a particular embodiment for use in a particular application, those having ordinary skill in the art and access to the teachings of the present invention will recognize additional modifications and applications within the scope thereof. For example, the materials used in the construction of the apparatus 10 may be changed without departing from the scope of the invention ie., the pan may be made of plastic or other suitable material. The manner of attachment of the pan may be changed as necessary for particular environments. In fact, the magnet may be dispensed with altogether and the pan made an integral part of the chassis of the vehicle so long as the oil may be removed and/or the absorptive inserts replaced. Further, the size and shape of the apparatus is not limited to that shown herein. The shape may be such as is necessary to suit a particular application and the size should be commensurate with the size of the vehicle, its clearance, and the rate of flow. Finally, the apparatus 10 may be used to collect other fluids instead of crankcase oil.

Accordingly, it intended by the appended claims to cover any and all such modifications within the scope of the present invention.

Thus, what is claimed is:

1. An apparatus for retention of fluid flowing from a container mounted on a vehicle comprising:
    an open-ended shallow pan having a center;
    a single unitary substantially annular magnet mounted near the center of said pan and attaching said pan to said vehicle;
    a first annular absorbent disposed in said pan within said magnet; and
    a second annular absorbent disposed in said pan and peripherally disposed immediately adjacent to and about said magnet.

2. The apparatus of claim 1 wherein said shallow pan has edges and said edges are corrugated.

3. The apparatus of claim 2 wherein the corrugated edges of said pan are beveled.

* * * * *